US007613292B2

(12) United States Patent
te Riet

(10) Patent No.: US 7,613,292 B2

(45) Date of Patent: Nov. 3, 2009

(54) ADJUSTABLE EARPIECE

(75) Inventor: Johan te Riet, Hengelo (NL)

(73) Assignee: Sony Ericsson Mobile Communications AB, Lund (SE)

(*) Notice: Subject to any disclaimer, the term of this patent is extended or adjusted under 35 U.S.C. 154(b) by 498 days.

(21) Appl. No.: 11/537,206

(22) Filed: Sep. 29, 2006

(65) Prior Publication Data

US 2008/0080704 A1 Apr. 3, 2008

(51) Int. Cl.
*H04M 1/00* (2006.01)
*H04R 25/00* (2006.01)

(52) U.S. Cl. ........................................ 379/430; 381/370

(58) Field of Classification Search ................. 379/430; 381/370, 374, 376, 378, 381
See application file for complete search history.

(56) References Cited

U.S. PATENT DOCUMENTS

2002/0051555 A1 5/2002 Cheng

FOREIGN PATENT DOCUMENTS

| | | | |
|---|---|---|---|
| EP | 1 372 353 | A1 | 6/2002 |
| WO | WO 03/107716 | | 12/2003 |
| WO | WO 2004/049752 | | 6/2004 |

OTHER PUBLICATIONS

Copy of International Preliminary Report on Patentability issued in corresponding international application No. PCT/IB2007/051080, mailed Jan. 23, 2009, 8 pages.

Copy of Written Opinion and International Search Report for corresponding PCT application with a mailing date of Aug. 16, 2007; 14 pages.

*Primary Examiner*—Tuan D Nguyen
(74) *Attorney, Agent, or Firm*—Harrity & Harrity, LLP

(57) ABSTRACT

An adjustable earpiece for a communications headset includes a hook, an arm to displaceably connect to the hook, a hinge to connect to the arm and to the communications headset, and a connection mechanism to adjustably prevent relative displacement of the arm and the hook.

20 Claims, 8 Drawing Sheets

ADJUSTABLE EARPIECE

BACKGROUND

1. Field of the Invention

Implementations described herein relate generally to devices and, more particularly, to an adjustable earpiece for a communications headset.

2. Description of Related Art

A communications headset may include a flip hook (or earpiece) positioned above and behind an ear of a user to secure the headset to the user. The flip hook may be configured to rotate about an axis toward or away from the headset so that the communications headset may be alternatively worn on either ear of the user. The flip hook may be flipped open to allow the user's ear in between, and may pivot at a bottom portion to further adjust the communications headset. Thus, typical flip hooks may provide three axes of freedom relative to the headset: flipping, pivoting, and flipping and rotating at the same time.

Despite three axes of freedom, some users may not comfortably wear a communications headset with a typical flip hook due to the different sizes of users' ears. For example, a headset with a typical flip hook may not properly rest on the ears of such users, or may press into or move away from the face of such users.

SUMMARY

According to one aspect, an earpiece for a communications headset may include a hook, an arm to displaceably connect to the hook, a hinge to connect to the arm and to the communications headset, and a connection mechanism to adjustably prevent relative displacement of the arm and the hook.

Additionally, the hook may include a junction that divides the hook into two portions and enables the hook to rotate relative to the communications headset.

Additionally, the hook may be shaped to substantially conform to an ear of a user.

Additionally, the hook may include at least one of natural rubber, synthetic rubber, plastic, or metal.

Additionally, the arm may include a ring and the hook may include a blade that is configured to engage the ring and prevent displacement of the arm relative to the hook.

Additionally, the ring may include a protrusion and the blade may include a hole configured to communicate with the protrusion of the ring to provide an indication of a position of the arm relative to the hook.

Additionally, the hook may include an opening that receives the arm and enables the arm to be displaced relative to the hook.

Additionally, the arm may be configured to be displaced relative to the hook a distance ranging from about zero millimeters to about 4.8 millimeters.

Additionally, the hinge may rotatably connect to the communications headset.

Additionally, the earpiece may include an elastically deformable coupling mechanism to connect to the hinge and to frictionally connect to a socket of the communications headset.

Additionally, the connection mechanism may include a nut provided around an outer surface of the hook and an outer surface of the arm.

Additionally, the nut may be configured to provide an inward radial force to fix a relative position of the hook to the arm.

According to another aspect, a communications headset may include a housing that includes at least one of a speaker or a microphone, and an earpiece to connect to the housing. The earpiece may include a hook, an arm to connect to the hook, a hinge to connect to the arm and to the housing, and a connection mechanism to connect the arm to the hook and configured to control displacement of the hook over a length of the arm.

Additionally, the communications headset may be configured to communicate with a device selected from at least one of a radiotelephone, a personal communications system (PCS) terminal, a personal digital assistant (PDA), a laptop computer, a global positioning satellite (GPS) device, a personal computer, a television, an MP3 player, or a pager.

Additionally, the housing may further include a socket that rotatably connects the hinge to the housing.

Additionally, the hook may include a junction that divides the hook into two portions and enables a first hook portion to rotate relative to the housing.

Additionally, the hook may be shaped to at least partially conform to an ear of a user.

Additionally, the arm may include a ring and the hook includes a blade to engage the ring and prevent displacement of the arm relative to the hook.

Additionally, the ring may include a protrusion and the blade may include a hole that is capable of communicating with the protrusion of the ring to provide an indication of a neutral position between the arm and the hook.

Additionally, the hook may include an opening that receives the arm and enables the arm to move towards and away from the hook.

Additionally, the arm may be capable of moving towards or away from the hook a distance ranging from about zero millimeters to about 2.4 millimeters.

According to yet another aspect, an earpiece may include a hook including an opening and configured to connect to an ear of a user, a blade provided within the opening of the hook, an arm capable of being displaced relative to the hook within the opening of the hook, a ring provided around an outer surface of the arm and configured to engage an inner surface of the blade, a hinge connected to the arm and configured to connect to a communications headset, and a nut connecting the arm to the hook and preventing displacement of the arm relative to the hook by causing the blade to engage and prevent movement of the ring.

According to a further aspect, a method may include loosening an adjustable nut connecting a hook and an arm of an earpiece, the earpiece being configured to connect to an ear of user, adjusting the displacement of the arm relative to the hook based on the size of the ear of the user, and tightening the adjustable nut to prevent displacement of the arm relative to the hook when the adjusting is determined.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Implementations described herein may provide an adjustable earpiece for a communications headset that may permit the headset to fit on the ears of most if not all users. For example, in one implementation, the earpiece may include a hook portion, an adjustable nut, an arm, and a hinge. The hook portion may rotate about an axis toward or away from the headset so that the communications headset may be alternatively worn on the left or right ear of the user. The hinge may connect to the arm, and may pivot about an axis to enable the earpiece to be flipped open to allow the user's ear in between and to further adjust the communications headset. The adjustable nut may enable the arm to telescope towards and away from the interconnected hook portion to further adjust the communications headset based on the size of a user's ear.

A "communications headset," as used herein, may include headphones, earphones, earbuds, stereophones, headsets, any instrument capable of receiving an electrical signal from a device and converting the electrical signal into audible sound waves, any instrument capable of converting audible sound waves into an electrical signal and transmitting the electrical signal to a device, etc.

The communications headset may connect to (e.g., wired or wirelessly) and be used in conjunction with a device. As used herein, a "device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; a television; an MP3 player (e.g., an iPod); a pager; and any other device capable of utilizing one or more communications headsets.

Figure 1:
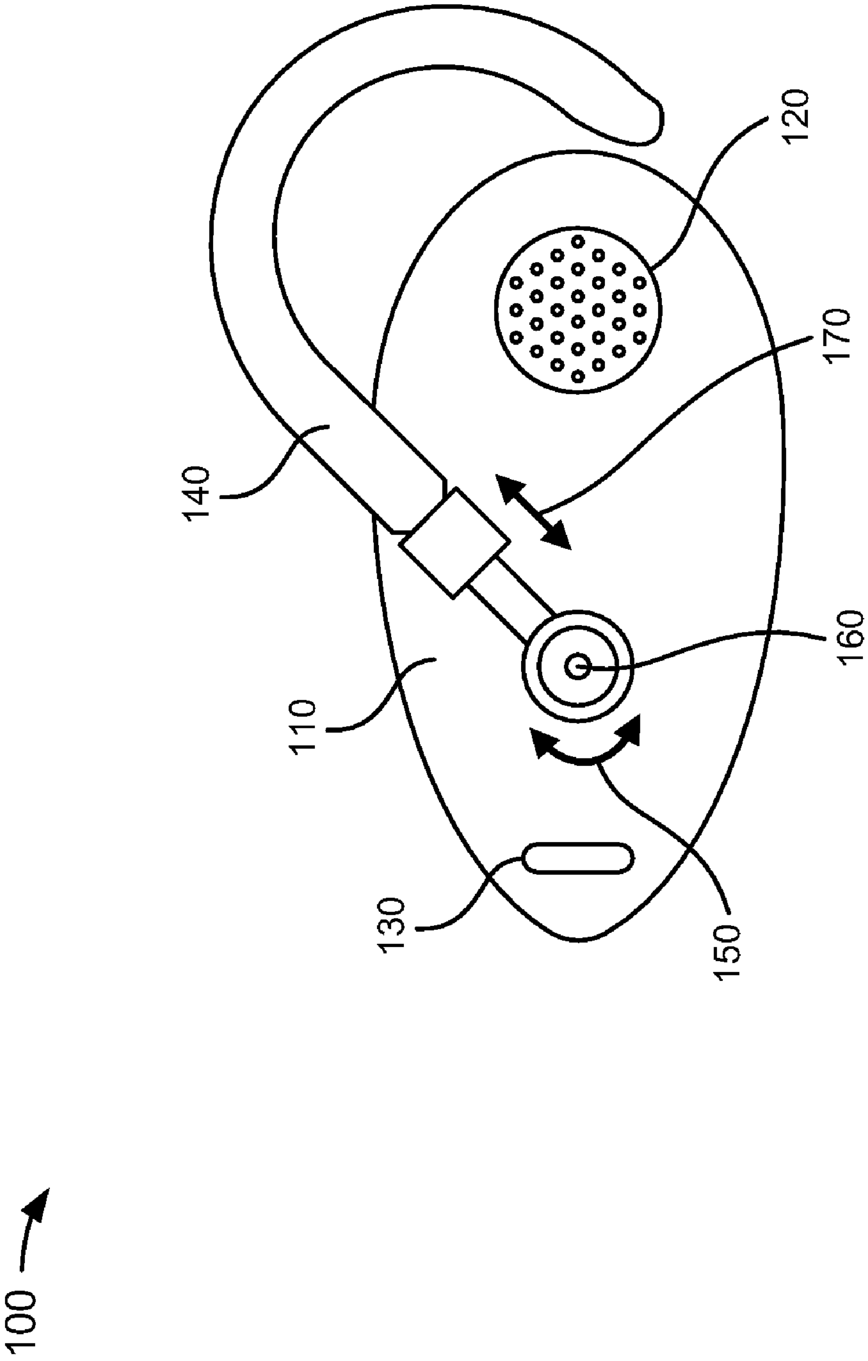
FIG. 1 is a front elevational view of an exemplary communications headset including an exemplary earpiece according to an implementation consistent with principles of the invention.

FIG. 1 is a diagram illustrating an exemplary communications headset 100 consistent with principles of the invention. As shown in FIG. 1, communications headset 100 may include a housing 110 provided with a speaker 120, a microphone 130, and an adjustable earpiece 140. Housing 110 may protect the components of communications headset 200 from outside elements. Speaker 120 may provide audible information to a user of communications headset 100 by converting electrical signals (e.g., from a device) into audible information. Speaker 120 may also protrude from housing 110 and may be positioned in a concha portion of the user's ear when communications headset 100 is worn by the user. Microphone 130 may receive audible information from the user and may convert the audible information into electrical signals for transmission (e.g., to a device).

Earpiece 140 may be positioned above and behind the ear when communications headset 100 is worn by the user. Earpiece 140 may connect to housing 110 via a socket 160, and may pivot about socket 160 to enable earpiece 140 to be flipped open to allow the user's ear in between and to further adjust communications headset 100. Earpiece 140 may also be displaced along a direction 170 to further adjust communications headset 100 based on the size of a user's ear. A portion of earpiece 140 may rotate about an axis toward or away from communications headset 100 so that communications headset 100 may be worn on either the left or right ear.

Although FIG. 1 shows a variety of components for communications headset 100, in other implementations, communications headset 100 may include fewer or more components. For example, communications headset 100 may include a keypad, a display for providing visual information to the user, control buttons 240 for permitting the user to interact with headset 100 to cause headset 100 to perform one or more operations, etc.

Exemplary Adjustable Earpiece

Figure 2B:
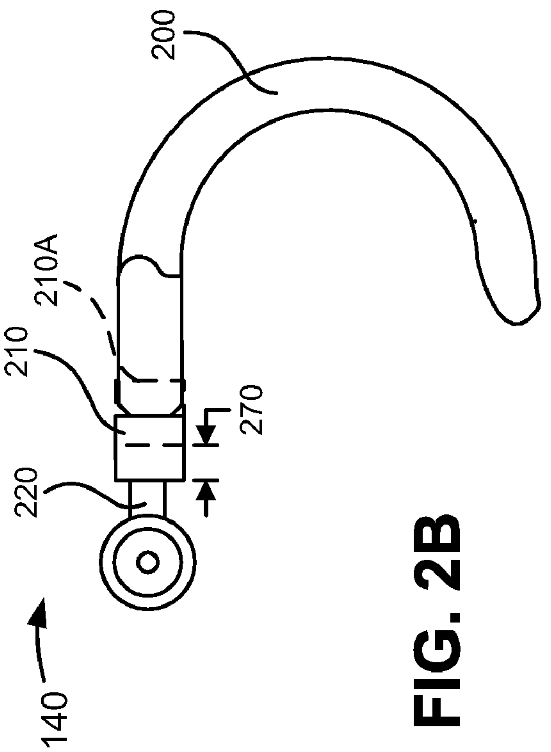
FIG. 2B is a front elevational view of the exemplary earpiece of FIG. 1 with the telescoping arm in an in position.
Figure 2A:
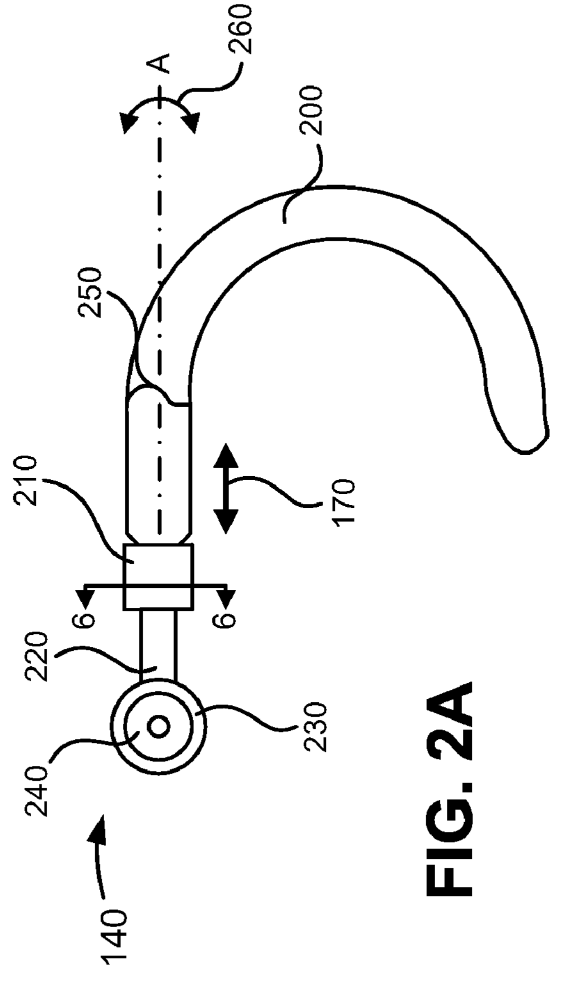
FIG. 2A is a front elevational view of the exemplary earpiece of FIG. 1 with a telescoping arm in a neutral position.
Figure 2C:
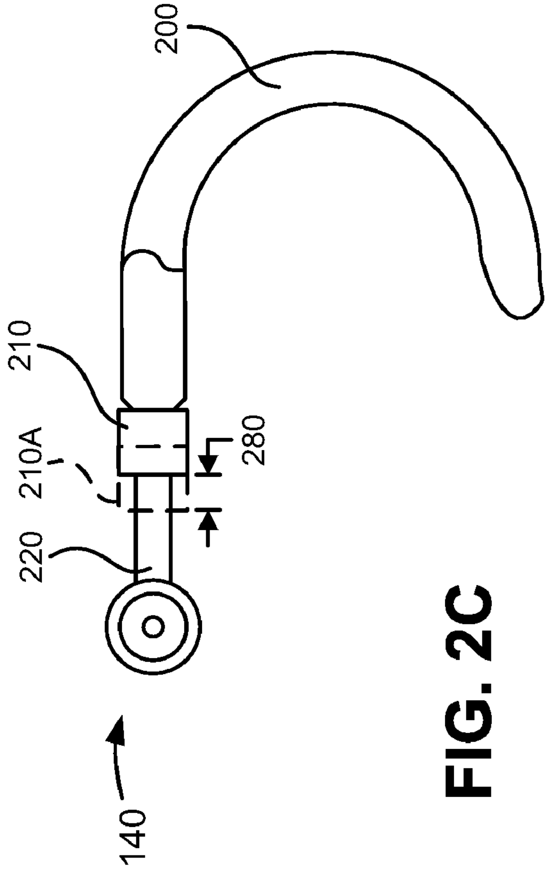
FIG. 2C is a front elevational view of the exemplary earpiece of FIG. 1 with the telescoping arm in an out position.

FIGS. 2A-2C are exemplary diagrams illustrating an exemplary earpiece (e.g., earpiece 140). As shown in FIG. 2A, earpiece 140 may include a hook 200, an adjustable nut 210, an arm 220, a hinge 230, and a coupling mechanism 240. Hook 200 may include a junction 250 that divides hook 200 into two portions and enables hook 200 to rotate in a direction 260 about an axis A. Rotational direction 260 may enable an ear-engaging portion of hook 200 to be swung towards and away from housing 110. In one implementation, for example, hook 200 may include a flip hinge or an indexing hinge at junction 250 that may include a spring mechanism that biases the ear-engaging portion of hook 200 towards a number of positions in relation to the stationary portion of hook 200. Such an arrangement may enable the ear-engaging portion of hook 200 to rotate about axis A toward or away from communications headset 100 so that communications headset 100 may be used in the left or right ears of the user. Adjustable nut 210 may interconnect hook 200 to arm 220, hinge 240 and coupling mechanism 240 in a manner such that arm 220 may telescope in direction 170 towards and away from hook 200, as described below. Coupling mechanism 240 may pivotally couple hinge 240 and earpiece 140 to housing 110, as described below.

Hook 200 may be a variety of sizes and shapes, for example, depending upon the size of one or more other components of communications headset 100. For example, in one implementation, hook 200 may be shaped to conform to shape of a human ear, and/or may be C-shaped, etc. Hook 200 may be made from a variety of materials, including any of the materials used to make existing hooks for headset flip hooks. For example, in one implementation, hook 200 may include rubber (natural or synthetic), plastic, metal, combinations of the aforementioned materials, etc. Hook 200 may be connected to the remaining portions of earpiece 140 in a variety of ways. For example, in one implementation, hook 200 may connect to arm 220 via adjustable nut 210. As described below, arm 220 may be moveably provided within hook 200 and may connect to hook 200 via tightening of adjustable nut 210. In another implementation, hook 200 may connect to arm 220 using other similar adjustable connection mechanisms.

Adjustable nut 210 may be a variety of sizes and shapes, for example, depending upon the size of one or more other components of communications headset 100. For example, in one implementation, nut 210 may be shaped to interconnect hook 200 and arm 220, and/or may be circular, octagonal, pentagonal, etc. Adjustable nut 210 may be made from a variety of materials, including any of the materials used to make existing components for headset flip hooks. For example, in one implementation, nut 210 may include rubber (natural or synthetic), plastic, metal, combinations of the aforementioned materials, etc. Adjustable nut 210 may interconnect portions of earpiece 140 in a variety of ways. For example, in one implementation, arm 220 may be moveably provided within hook 200 and may interconnect to hook 200 via tightening of adjustable nut 210, as described below. In another implementation, adjustable nut 210 may be replaced with other similar adjustable connection mechanisms. As described below, adjustable nut 210 may include an inner screw thread that engages a portion of hook 200. Nut 210 may be turned a portion of a full turn (e.g., one quarter of a full turn, where a full turn is three-hundred and sixty degrees) to release the clamp on the telescoping arm 220. The user may push arm 220 toward hook 200 or pull arm away from hook 200 to a desirable position. The user may fasten the telescoping arm 220 by turning adjustable nut 210 again (e.g., a portion of full turn). Hook 200 may provide the flipping action (e.g., via junction 250) whether or not adjustable nut 210 is tightened or loosened.

Arm 220 may be a variety of sizes and shapes, for example, depending upon the size of one or more other components of communications headset 100. For example, in one implementation, arm 220 may be shaped to be received within adjustable nut 210, and/or may be circular, octagonal, pentagonal, etc. Arm 220 may be made from a variety of materials, including any of the materials used to make existing components for headset flip hooks. For example, in one implementation, arm 220 may include rubber (natural or synthetic), plastic, metal, combinations of the aforementioned materials, etc. Arm 220 may interconnect to the remaining portions of earpiece 140 in a variety of ways. For example, in one implementation, arm 220 may be moveably provided within hook 200 and may interconnect to hook 200 via tightening of adjustable nut 210, as described below. As shown in FIG. 2A and described below, arm 220 may be provided in a "neutral" or starting position.

As shown in FIG. 2B, arm 220 may also be provided in a contracted or "pushed in" position by turning nut 210 a portion of a full turn (e.g., one quarter of a full turn) to release the clamp on the telescoping arm 220. The user may push arm 220 toward hook 200 a distance 270 to place arm 220 in the contracted position. Distance 270 may be determined by comparing the distance between adjustable nut 210A and hinge 230 in the neutral position (in FIG. 2A) and adjustable nut 210 and hinge 230 in the contracted position (in FIG. 2B). For example, in one implementation, distance 270 may be in the range of about zero millimeters (mm) to about 2.4 mm. The user may fix the telescoping arm 220 in the contracted position by tightening adjustable nut 210 (e.g., a portion of full turn).

As shown in FIG. 2C, arm 220 may further be provided in an extended or "pulled out" position by turning nut 210 a portion of a full turn (e.g., one quarter of a full turn) to release the clamp on the telescoping arm 220. The user may pull arm 220 away from hook 200 a distance 280 to set arm 220 in the extended position. Distance 280 may be determined by comparing the distance between adjustable nut 210A and hinge 230 in the neutral position (in FIG. 2A) and adjustable nut 210 and hinge 230 in the extended position (in FIG. 2C). For example, in one implementation, distance 280 may be in the range of about zero millimeters (mm) to about 2.4 mm. The user may fix the telescoping arm 220 in the extended position by tightening adjustable nut 210 (e.g., a portion of full turn).

Whether a user sets arm 220 in the neutral, contracted, or extended positions may depend upon the size of the user's ear as well as how the user desires communications headset 100 to rest on the user's ear. The user may set the desired position of arm 220 once, and may not need to adjust arm 220 each time headset 100 is worn. Alternatively, the user may adjust the telescoping action of arm 220 any number of times. In other implementations, the user may adjust telescoping arm 220 any distance between the contracted or extended positions. Alternatively or additionally, the user may adjust telescoping arm 220 a distance greater the contracted or extended positions.

Hinge 230 may be a variety of sizes and shapes, for example, depending upon the size of one or more other components of communications headset 100. For example, in one implementation, hinge 230 may be cylindrical-shaped and have an opening to receive coupling mechanism 240, and/or may be circular, ring-shaped, doughnut-shaped, etc. Hinge 230 may be made from a variety of materials, including any of the materials used to make existing components for headset flip hooks. For example, in one implementation, hinge 230 may include rubber (natural or synthetic), plastic, metal, combinations of the aforementioned materials, etc. Hinge 230 may be connected to arm 220 in a variety of ways. For example, in one implementation, hinge 230 may be integrally formed with arm 220. In other implementations, hinge 230 may connect to arm 220 using glue, adhesive, and/or other similar connection mechanisms.

Coupling mechanism 240 may be a variety of sizes and shapes, for example, depending upon the size of one or more other components of communications headset 100. For example, in one implementation, coupling mechanism 240 may be cylindrical-shaped and have an opening to receive socket 160, and/or may be circular, ring-shaped, doughnut-shaped, etc. Coupling mechanism 240 may be made from a variety of materials, including any of the materials used to make existing components for headset flip hooks. For example, in one implementation, coupling mechanism 240 may include an elastically deformable material (e.g., rubber (natural or synthetic), plastic, and/or combinations of the aforementioned materials), etc. Coupling mechanism 240 may connect to hinge 230 in a variety of ways. For example, in one implementation, coupling mechanism 240 may be force fit with hinge 230. In other implementations, coupling mechanism 240 may connect to hinge 230 using glue, adhesive, and/or other similar connection mechanisms (e.g., via heating curing of coupling mechanism within hinge 230). By providing hinge 230 with coupling mechanism 240 a snap-coupling may be provided between socket 160 of housing 110 and hinge 230 since coupling mechanism 240 may permit socket 160 to be forced into coupling mechanism 240 by elastic deformation. Coupling mechanism 240 may also provide increased friction between socket 160 and hinge 230, which may contribute to holding housing 110 in a preferred position on the user's ear, after adjustment of communications headset 100.

Figure 3C:
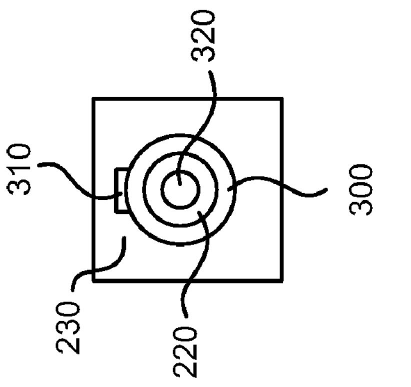
FIG. 3C is a side elevational view of the hinge and arm portions of FIG. 3A.
Figure 3B:
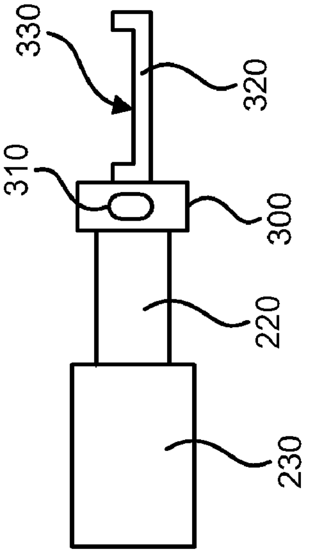
FIG. 3B is a plan view of the hinge and arm portions of FIG. 3A.
Figure 3A:
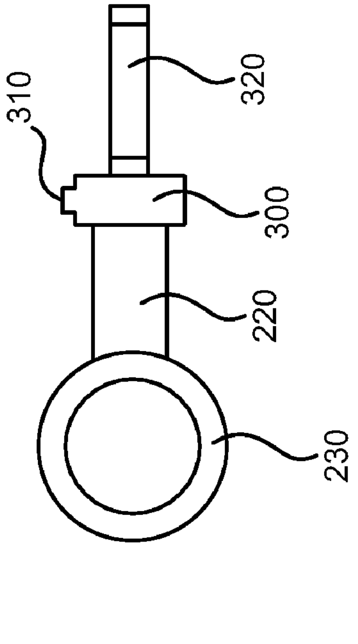
FIG. 3A is a front elevational view of hinge and arm portions of the exemplary earpiece of FIGS. 1 and 2A-2C.

FIGS. 3A-3C provide front elevational, plan, and side elevational views, respectively, of arm 220 and hinge 230 of earpiece 140. As shown in FIGS. 3A-3C, a ring 300 with a protrusion 310, and an extension 320 may cooperate with arm 220. Ring 300 may be provided around the outer surface of arm 220, and arm 220 may freely rotate within ring 300. Ring 300 may be a variety of sizes and shapes, for example, depending upon the size of one or more other components of communications headset 100. For example, in one implementation, ring 300 may be cylindrical-shaped and have an opening to receive arm 220, and/or may be circular, ring-shaped, doughnut-shaped, etc. Ring 300 may be made from a variety of materials, including any of the materials used to make existing components for headset flip hooks. For example, in one implementation, ring 300 may include rubber (natural or synthetic), plastic, metal, and/or combinations of the aforementioned materials, etc. In another implementation, ring 300 may be free molded (also known as "in mold assembly") from an elastomeric material. Protrusion 310 may extend away from an outer surface of ring 300 may be a variety of shapes and sizes. For example, protrusion 310 may be sized and shaped to provide an indication of various position settings (e.g., the neutral position) of earpiece 140, as described below.

Extension 320 may be a variety of sizes and shapes, for example, depending upon the size of one or more other components of communications headset 100. For example, in one implementation as shown in FIG. 3B, extension 320 may be cylindrical-shaped and may have a recessed portion 330, and/or may be cylindrical-shaped without a recessed portion, etc. Extension 320 may be made from a variety of materials, including any of the materials used to make existing components for headset flip hooks. For example, in one implementation, extension 320 may include rubber (natural or synthetic), plastic, and/or combinations of the aforementioned materials, etc. Extension 320 may connect to arm 220 in a variety of ways. For example, in one implementation, extension 320 may be integrally formed with arm 220. In other implementations, extension 320 may connect to arm 220 using glue, adhesive, and/or other similar connection mechanisms.

Figure 4B:
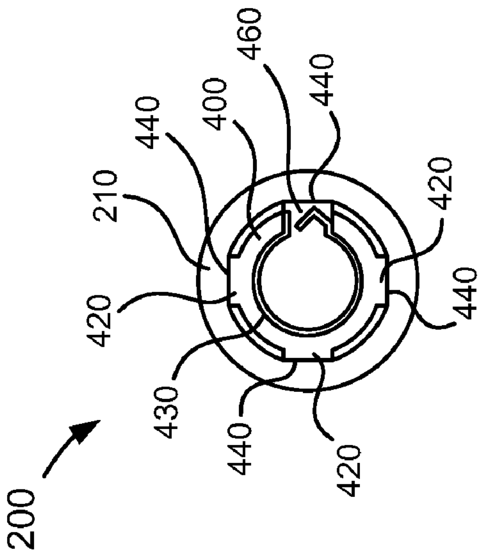
FIG. 4B is a side elevational view of the hook portion of FIG. 4B.
Figure 4A:
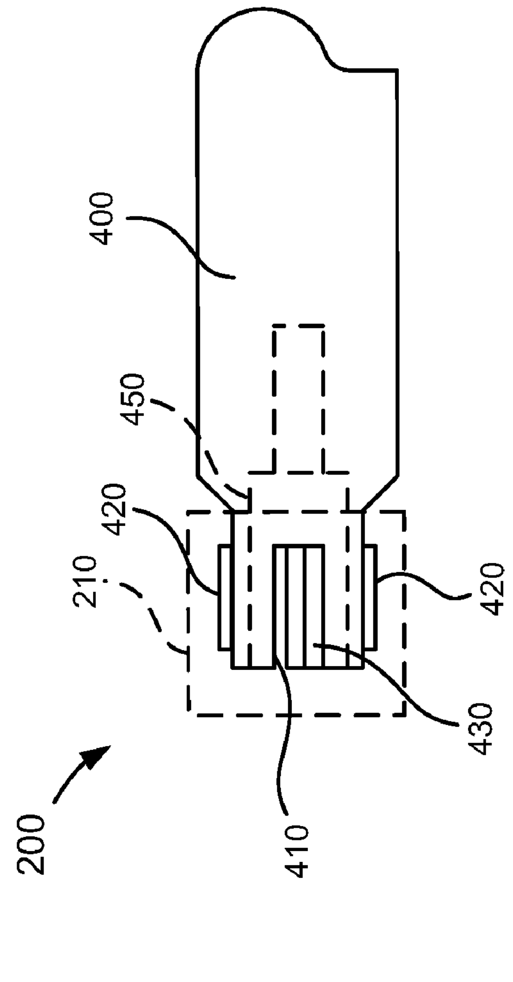
FIG. 4A is a front elevational view of a hook portion of the exemplary earpiece of FIGS. 1 and 2A-2C.

FIGS. 4A and 4B are front and side elevational views, respectively, of hook 200. As shown in FIG. 4A, hook 200 may include a bearing portion 400 with a window 410 provided therein and an outer thread 420 extending away from an outer surface of bearing portion 400. A blade 430 for locking telescoping arm 220 (as described below) may be provided within bearing portion 400, and a portion of blade 410 may be seen in window 410 of bearing portion 400. As further shown in FIG. 4A, an opening 450 may be provided within bearing portion 400 for receiving telescoping arm 220, as described below. The outer surface of a part of bearing portion 400 may be surrounded by nut 210, as shown in FIG. 4A.

As shown in FIG. 4B, nut 210 may include an inner thread (described below in connection with FIGS. 6A and 6B) that may be interrupted by axial grooves or recesses 440. Outer thread 420 of bearing portion 400 may be interrupted by a slit 460. Outer thread 420 may communicate with the inner thread provided in nut 210. That is, outer thread 420 may be sized and shaped to conform to the size and shape of the inner thread of nut 210. One axial recess 440 may communicate with a part of blade 430 via slit 460 provided in bearing portion 400, as further shown in FIG. 4B. Blade 430 may be provided within and conform to the shape of an inner surface of bearing portion 400.

Figure 5B:
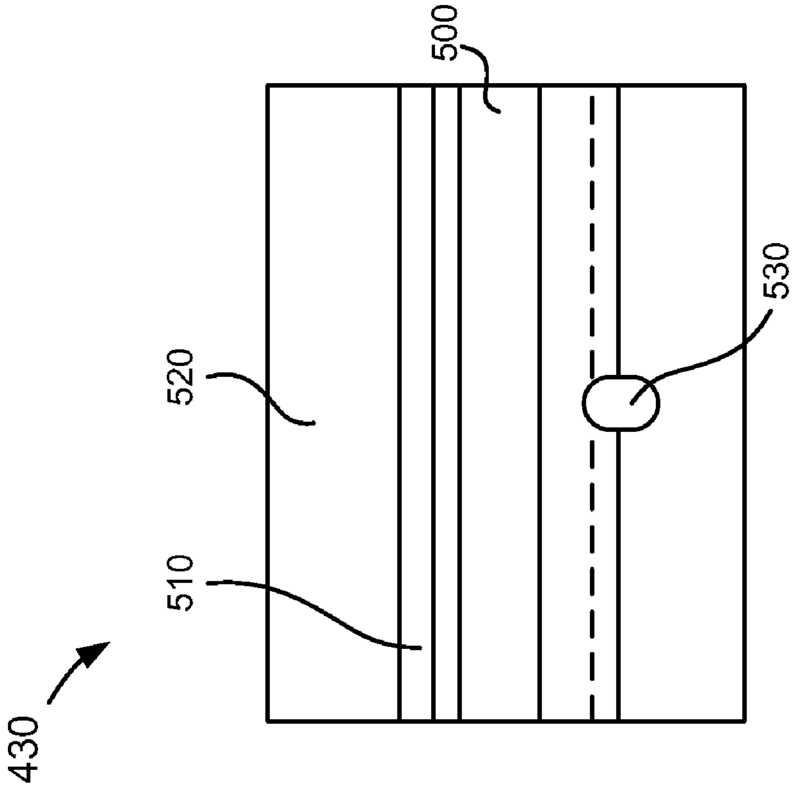
FIG. 5B is a side elevational view of the blade of FIG. 5A.
Figure 5A:
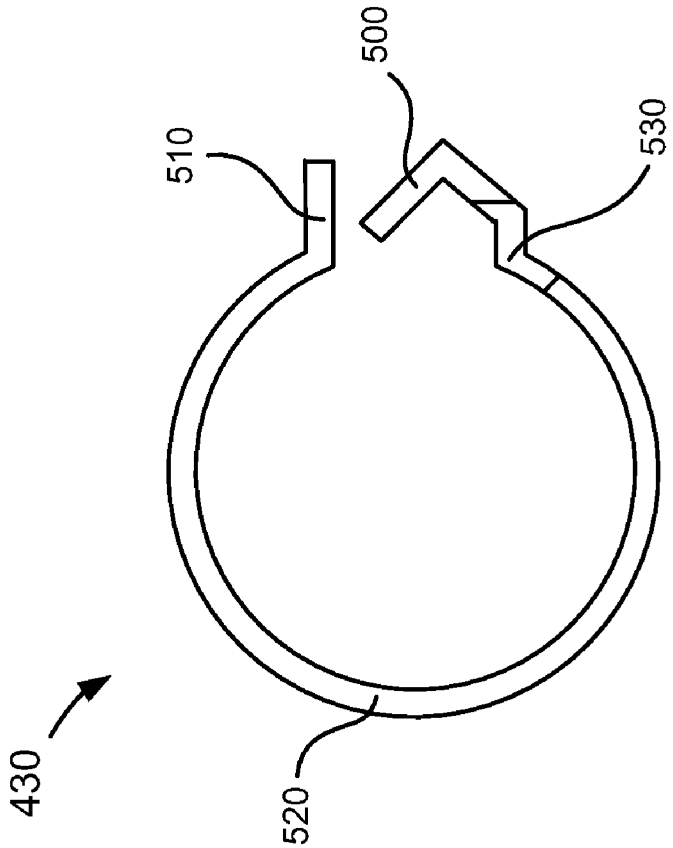
FIG. 5A is a front elevational view of a blade provided within the hook portion of the exemplary earpiece of FIGS. 1 and 2A-2C.

FIGS. 5A and 5B are front and side elevational views, respectively, of blade 430 shown in FIGS. 4A and 4B. As shown in FIGS. 5A and 5B, blade 430 may include a C-shaped portion 500, an abutment portion 510, and a cylindrical body 520 integrally formed together. Blade 430 may further include a hole 530 that may communicate with protrusion 310 or ring 300 to indicate various position settings (e.g., the neutral position) of earpiece 140, as described below. Blade 430 may be a variety of sizes and shapes, for example, depending upon the size of one or more other components of communications headset 100. For example, in one implementation, blade 430 may be cylindrical-shaped and include hole 530 to receive protrusion 310. Blade 430 may be made from a variety of materials, including any of the materials used to make existing components for headset flip hooks. For example, in one implementation, blade 430 may include rubber (natural or synthetic), plastic, metal, and/or combinations of the aforementioned materials, etc. Blade 430 may provide a locking mechanism for telescoping arm 220, as described below.

Figure 6B:
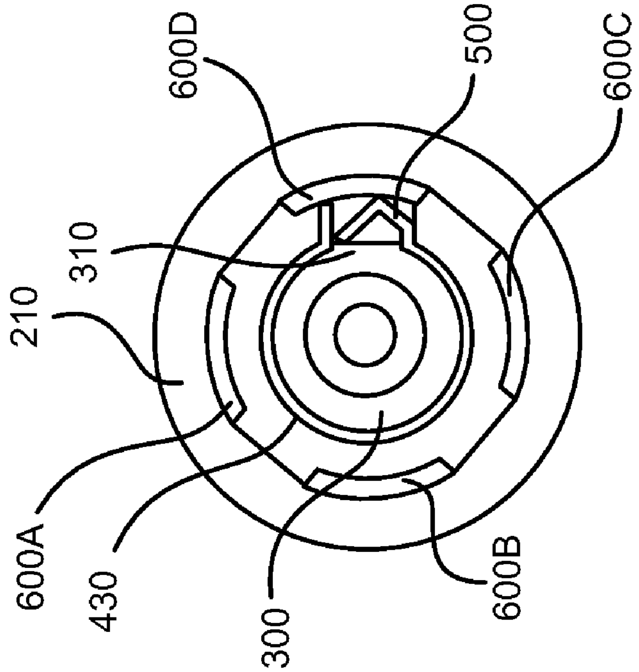
FIG. 6B is a cross-sectional view, taken along line 6-6 of FIG. 2A, of portions of the exemplary earpiece of FIGS. 1 and 2A-2C, with the telescoping arm provided in a locked position.
Figure 6A:
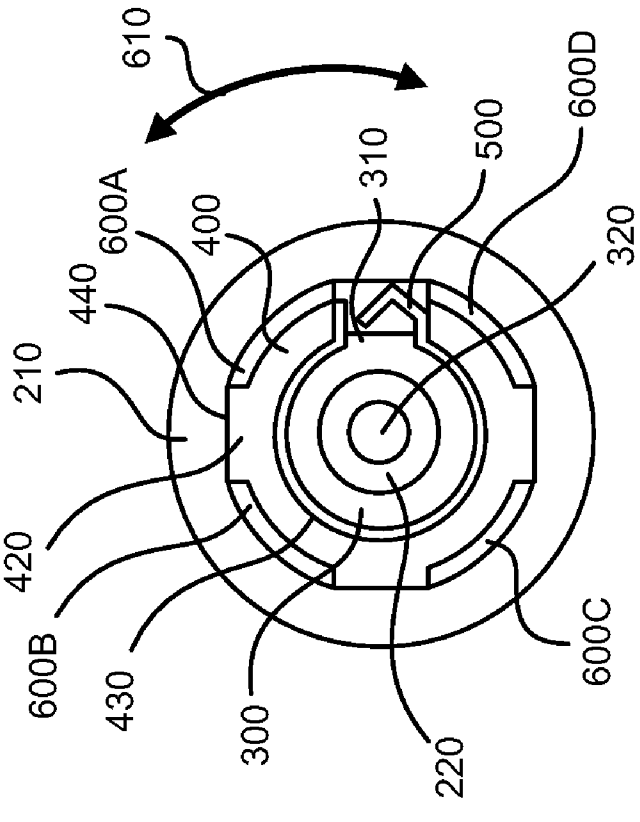
FIG. 6A is a cross-sectional view, taken along line 6-6 of FIG. 2A, of portions of the exemplary earpiece of FIGS. 1 and 2A-2C, with the telescoping arm provided in an unlocked position.

FIG. 6A is a cross-sectional view, taken along line 6-6 of FIG. 2A, of portions of earpiece 140, with telescoping arm 220 provided in a moveable or "unlocked" position. As shown in FIG. 6A, a portion of arm 220 may be surrounded by ring 300, blade 430 may surround ring 300, and a part of bearing portion 400 may surround blade 430. In the unlocked position, protrusion 310 of ring 300 may be received in hole 530 of blade 430. As further shown in FIG. 6A, nut 210 may include threads 600A, 600B, 600C, and 600D (collectively referred to as threads 600), and may be rotated in a direction 610 to lock or unlock telescoping arm 220. Threads 600 and nut 210 of FIG. 6A may be provided in an unlocked position so that telescoping arm 220 may be adjusted. In the unlocked position, nut 210 (e.g., threads 600 of nut 210) may not provide an inward radial force on bearing portion 400. In turn, bearing portion 400 may not apply an inward radial force on blade 430, and blade 430 may not apply an inward radial force on ring 300. Thus, arm 220 may telescope towards or away from hook 200.

FIG. 6B is a cross-sectional view, taken along line 6-6 of FIG. 2A, of portions of earpiece 140, with telescoping arm 220 provided in a fixed or "locked" position. Nut 210 may be rotated a portion of a full turn (e.g., one quarter of a turn) so that threads 600A, 600B, 600C, and 600D may be aligned as shown in FIG. 6B. In the locked position, nut 210 (e.g., threads 600 of nut 210) may provide an inward radial force on blade 430, and blade 430 may apply an inward radial force on ring 300. Thus, arm 220 may be prevented from telescoping towards or away from hook 200, but may rotate freely within ring 300.

Figure 7B:
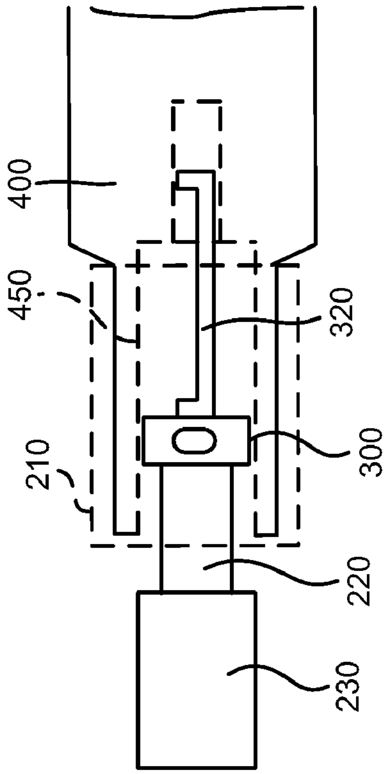
FIG. 7B is a plan view, in partial cross section, of portions of the exemplary earpiece of FIGS. 1 and 2A-2C, with the telescoping arm provided in a contracted position.
Figure 7A:
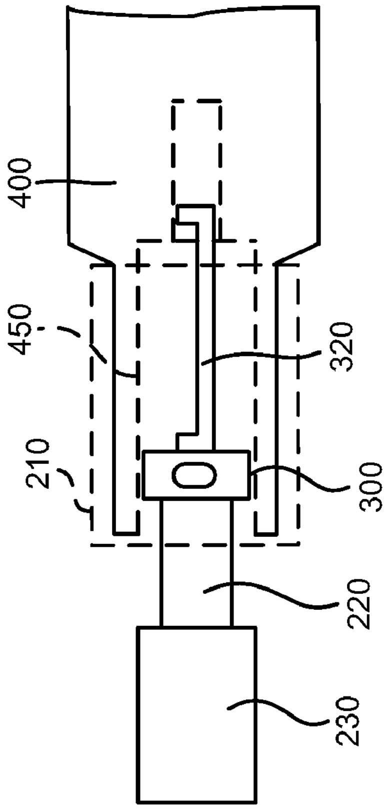
FIG. 7A is a plan view, in partial cross section, of portions of the exemplary earpiece of FIGS. 1 and 2A-2C, with the telescoping arm provided in a neutral position.

FIG. 7A is a plan view, in partial cross section, of portions of earpiece 140, with telescoping arm 220 provided in the neutral position. As shown in FIG. 7A, a part of arm 220, ring 300, and extension 320 may be received in opening 450 of bearing portion 400. Opening 450 may be sized to accommodate extension 320 as arm 220 is moved towards and/or away from bearing portion 400 of hook 140.

FIG. 7B is a plan view, in partial cross section, of portions of earpiece 140, with telescoping arm 220 provided in the contracted position. As shown in FIG. 7B, nut 210 may be loosened (e.g., by partially turning nut 210), and arm 220 may pushed in towards bearing portion 400 a predetermined distance. For example, in one implementation described above in connection with FIG. 2B, the user may push arm 220 toward hook 200 a predetermined distance (e.g., distance 270) to set the arm in the contracted position. Distance 270 may be in the range of about zero millimeters (mm) to about 2.4 mm. If arm 220 is provided in the contracted position, extension 320 may extend further into opening 450 of bearing portion 400 than it does in the neutral position.

Figure 7C:
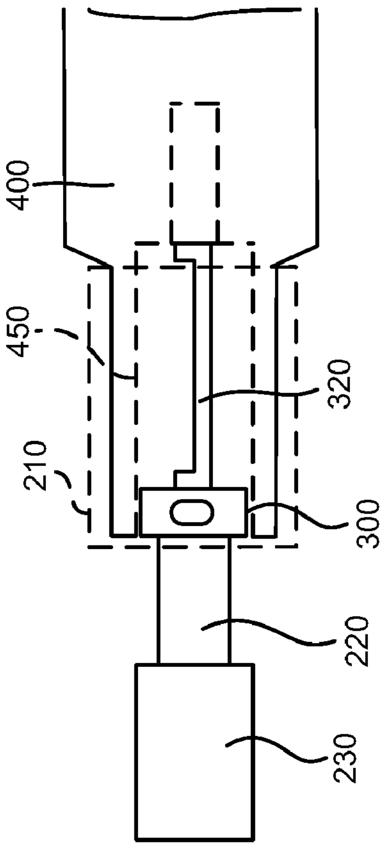
FIG. 7C is a plan view, in partial cross section, of portions of the exemplary earpiece of FIGS. 1 and 2A-2C, with the telescoping arm provided in an extended position.

FIG. 7C is a plan view, in partial cross section, of portions of earpiece 140, with telescoping arm 220 provided in the extended position. As shown in FIG. 7C, nut 210 may be loosened (e.g., by partially turning nut 210), and arm 220 may pulled away from bearing portion 400 a predetermined distance. For example, in one implementation described above in connection with FIG. 2C, the user may pull arm 220 away from hook 200 a predetermined distance (e.g., distance 280) to set the arm in the extended position. Distance 280 may be in the range of about zero millimeters (mm) to about 2.4 mm. If arm 220 is provided in the extended position, extension 320 may extend less into opening 450 of bearing portion 400 than it does in the neutral position.

Although FIGS. 7A-7C show arm 220 telescoping towards and/or away from bearing portion 400 a predetermined distance, in other implementations, arm 220 may move towards and/or away from bearing portion 400 a larger distance than the predetermined distance described above. Furthermore, in other implementations, arm 220 may include an opening that receives bearing portion 400 rather than bearing portion 400 receiving arm within opening 450.

Exemplary Process

Figure 8:
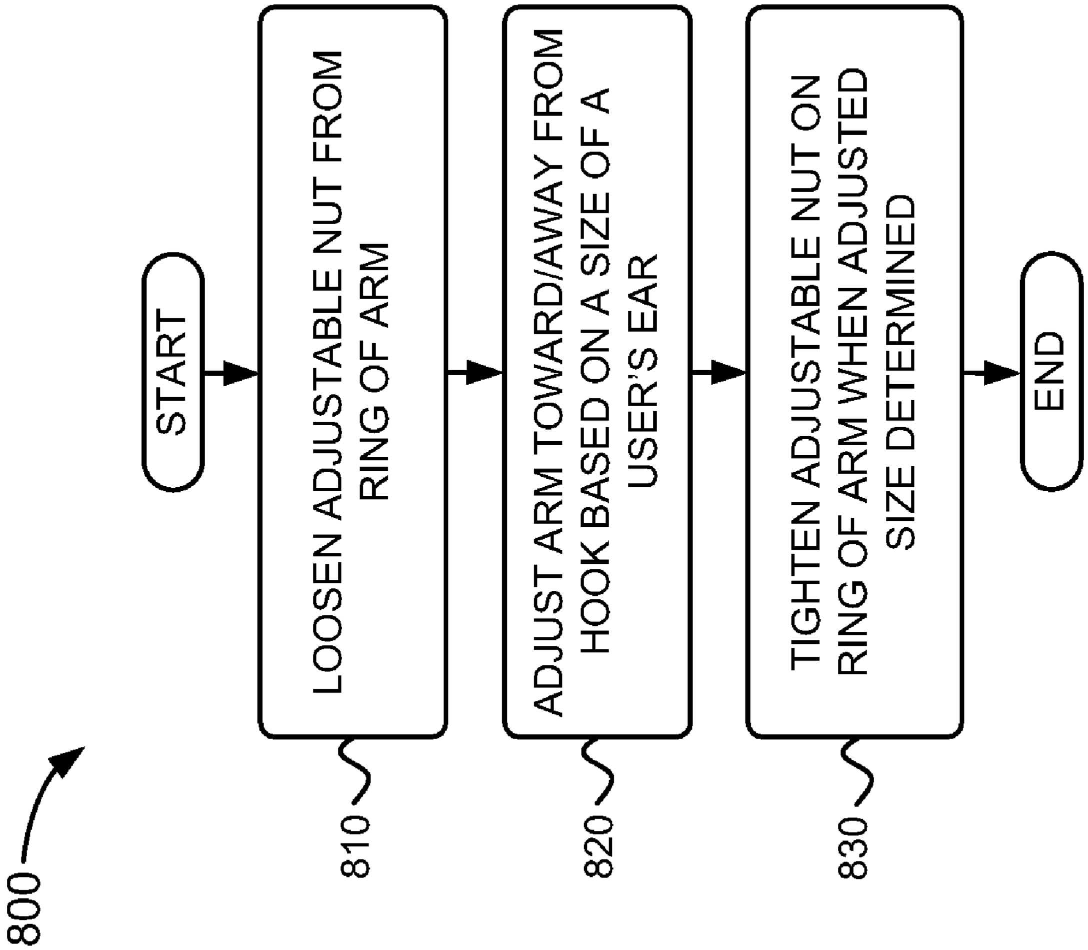
FIG. 8 is a flowchart of an exemplary process according to an implementation consistent with principles of the invention.

FIG. 8 is a flowchart of an exemplary process 800 according to an implementation consistent with principles of the invention. As shown in FIG. 8, process 800 may loosen an adjustable nut from a ring of an arm of an earpiece (block 810). For example, in one implementation described above in connection with FIGS. 2A-2C, nut 210 may be turned a portion of a full turn (e.g., one quarter of a full turn) to release the clamp on telescoping arm 220. In another implementation described above in connection with FIG. 6A, in the unlocked position, nut 210 (e.g., threads 600 of nut 210) may not provide an inward radial force on bearing portion 400. In turn, bearing portion 400 may not apply an inward radial force on blade 430, and blade 430 may not apply an inward radial force on ring 300. Thus, arm 220 may telescope towards or away from hook 200.

As further shown in FIG. 8, process 800 may adjust arm towards and/or away from a hook of the earpiece based on a size of a user's ear (block 820). For example, in one implementation described above in connection with FIGS. 2B and 2C, the user may push arm 220 toward hook 200 or pull arm 220 away from hook 200 a predetermined distance (e.g., distance 270 or 280) to set the arm in the contracted or extended positions. Whether a user sets arm 220 in the neutral, contracted, or extended positions (or at other shortened or elongated positions) may depend upon the size of the user's ear as well as how the user desires communications headset 100 to be provided on the user's ear. In another implementation described above in connection with FIGS. 7A and 7B, if arm 220 is provided in the contracted position, extension 320 may extend further into opening 450 of bearing portion 400 than it does in the "neutral" position. If arm 220 is provided in the extended position, extension 320 may extend less into opening 450 of bearing portion 400 than it does in the "neutral" position.

Process 800 may tighten the adjustable nut on the ring of the arm when the adjusted size is determined (block 830). For example, in one implementation described above in connection with FIGS. 2B and 2C, the user may lock the telescoping arm 220 in the extended or contracted positions (or at other positions) by turning adjustable nut 210 (e.g., a portion of full turn). In another implementation described above in connection with FIG. 6B, nut 210 may be rotated a portion of a full turn (e.g., one quarter of a turn) in direction 610 so that threads 600A, 600B, 600C, and 600D may be aligned as shown in FIG. 6B. In the locked position, nut 210 (e.g., threads 600 of nut 210) may provide an inward radial force on blade 430, and blade 430 may apply an inward radial force on ring 300. Thus, arm 220 may be prevented from telescoping towards or away from hook 200, but may rotate freely within ring 300.

CONCLUSION

Implementations described herein may provide a one-size-fits-all earpiece for a communications headset that may permit the headset to fit comfortably on the ears of most if not all users. For example, in one implementation, the earpiece may include a hook portion, an adjustable nut, an arm, and a hinge. The hook portion may rotate about an axis toward or away from the headset so that the communications headset may be worn on either ear. The hinge may connect to the arm, and may pivot about an axis to enable the earpiece to be flipped open to accommodate the user's ear and to further adjust the communications headset. The adjustable nut may enable the arm and the interconnected hook portion to be displaced relative to each other along the telescoping arm. The earpiece may prevent the communications headset from pinching into or moving away from the user's face.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 8, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An earpiece for a communications headset, comprising:

a hook;

an arm to displaceably connect to the hook, where the arm includes a ring and the hook includes a blade to engage the ring and prevent displacement of the arm relative to the hook;

a hinge to connect to the arm and to the communications headset; and a connection mechanism to adjustably prevent relative displacement of the arm and the hook.

2. The earpiece of claim 1, where the hook includes a junction that divides the hook into two portions and enables the hook to rotate relative to the communications headset.

3. The earpiece of claim 1, where the hook is shaped to substantially conform to an ear of a user.

4. The earpiece of claim 1, where the hook includes at least one of natural rubber, synthetic rubber, plastic, or metal.

5. The earpiece of claim 1, where the ring includes a protrusion and the blade includes a hole to communicate with the protrusion of the ring to provide an indication of a position of the arm relative to the hook.

6. The earpiece of claim 1, where the hook includes an opening that receives the arm and enables the arm to be displaced relative to the hook.

7. The earpiece of claim 1, where the arm is displaceable relative to the hook a distance ranging from about zero millimeters to about 4.8 millimeters.

8. The earpiece of claim 1, where the hinge rotatably connects to the communications headset.

9. The earpiece of claim 1, further comprising:

an elastically deformable coupling mechanism to connect to the hinge and to frictionally connect to a socket of the communications headset.

10. The earpiece of claim 1, where the connection mechanism comprises a nut provided around an outer surface of the hook and an outer surface of the arm.

11. The earpiece of claim 10, where the nut is to provide an inward radial force to fix a relative position of the hook to the arm.

12. A communications headset comprising:

a housing that includes at least one of a speaker or a microphone; and an earpiece to connect to the housing, the earpiece including:

a hook, an arm to connect to the hook, where the arm includes a ring and the hook includes a blade to engage the ring and prevent displacement of the arm relative to the hook, a hinge to connect to the arm and to the housing, and a connection mechanism to:

connect the arm to the hook, and control displacement of the hook over a length of the arm.

13. The communications headset of claim 12, where the communications headset is to communicate with a device selected from at least one of:

a radiotelephone;

a personal communications system (PCS) terminal;

a personal digital assistant (PDA);

a laptop computer;

a global positioning satellite (GPS) device;

a personal computer;

a television;

an MP3 player; or a pager.

14. The communications headset of claim 12, where the housing further includes a socket that rotatably connects the hinge to the housing.

15. The communications headset of claim 12, where the hook includes a junction that divides the hook into two portions and enables a first hook portion to rotate relative to the housing.

16. The communications headset of claim 12, where the hook is shaped to at least partially conform to an ear of a user.

17. The communications headset of claim 12, where the ring includes a protrusion and the blade includes a hole that is capable of communicating with the protrusion of the ring to provide an indication of a neutral position between the arm and the hook.

18. The communications headset of claim 12, where the hook includes an opening that receives the arm and enables the arm to move towards and away from the hook.

19. The communications headset of claim 12, where the arm is capable of moving towards or away from the hook a distance ranging from about zero millimeters to about 2.4 millimeters.

20. An earpiece for a communication headset, the earpiece comprising:

a hook including an opening, the hook being to connect to an ear of a user;

a blade provided within the opening of the hook;

an arm being displaced relative to the hook within the opening of the hook;

a ring provided around an outer surface of the arm, the ring being to engage an inner surface of the blade;

a hinge connected to the arm, the hinge being to connect to a communications headset; and a nut connecting the arm to the hook and preventing displacement of the arm relative to the hook by causing the blade to engage and prevent movement of the ring.

* * * * *